United States Patent
Baranowski et al.

[15] 3,696,692
[45] Oct. 10, 1972

[54] PROCESS FOR FORMING A SAW CHAIN CUTTER LINK

[72] Inventors: Karl F. Baranowski; Alexander Barrio, Jr., both of Milwaukie, Oreg.

[73] Assignee: Omark Industries, Inc., Portland, Oreg.

[22] Filed: April 26, 1971

[21] Appl. No.: 137,377

[52] U.S. Cl. ............................76/112, 143/135
[51] Int. Cl. .......................................B23d 63/00
[58] Field of Search ..76/112; 72/377, 405, 404, 335; 143/135 G

[56] References Cited

UNITED STATES PATENTS

| | | |
|---|---|---|
| 2,713,276 | 7/1955 | Silverson..................76/112 |
| 3,269,434 | 8/1966 | Cooper..................143/135 G |
| 3,367,216 | 2/1968 | Anderson..................76/112 |

*Primary Examiner*—Donald R. Schran
*Attorney*—Robert L. Harrington

[57] ABSTRACT

A saw chain comprised of center links interconnected by side links. Certain of the side links having extensions forming cutter portions for cutting trees and the like. Said cutter portion including a side plate and top plate with an intermediate, substantially sharp corner. The thickness at said corner is greater than the thickness of the side plate and top plate. Said thickened corner being formed by first coining a thickened rib-like section into the cutter blank prior to bending the top plate and then forming the top plate by bending in such a manner that the thickened section becomes located at the corner.

2 Claims, 6 Drawing Figures

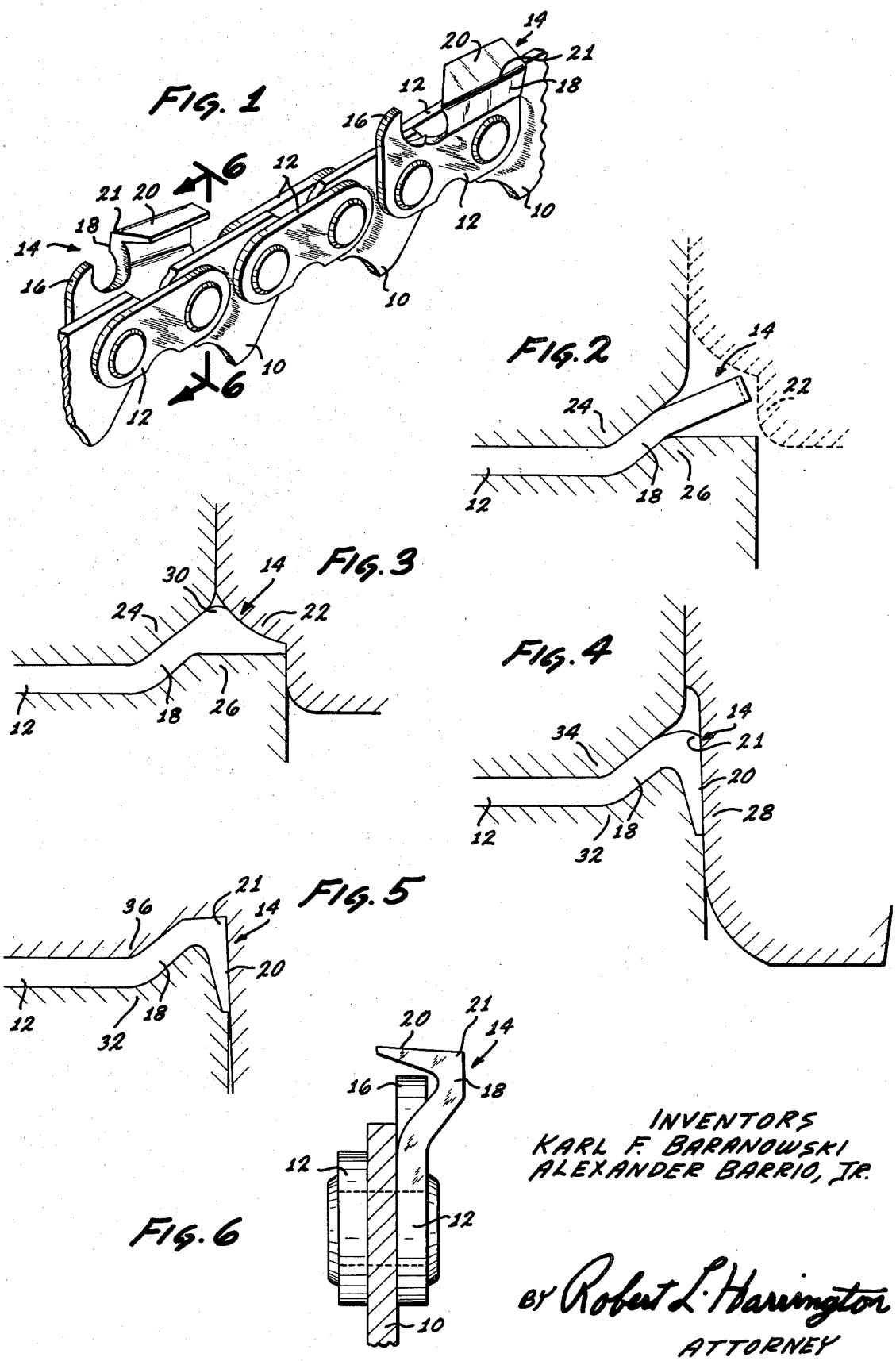

PROCESS FOR FORMING A SAW CHAIN CUTTER LINK

This invention relates to saw chain more particularly to saw chain having a hooded cutter, i.e., a top plate having cutting edge at substantially a right angle to the cutting edge of a side plate, which cutter is formed essentially without grinding, but with a relatively sharp corner intermediate the top and side plates.

Hooded cutters are popular for saw chain used in the tree harvesting industry for cutting trees. Two basic types of saw chain are chipper chain having rounded corners and chisel chain having square corners. In most recent years the chipper type cutters have become predominate. The chipper type cutter is distinguished by its round corner which can be formed in a cold forming operation merely by bending the cutter in a suitable die. Whereas chisel type cutters are recognized as cutting faster, and thus more desirable from the standpoint of performance, they are considerably more expensive to manufacture. The additional expense results from the necessity of grinding the square or sharp corner into the cutter. This grinding is required because of the inability of prior technology to either bend the blank of metal tight enough or coin the metal after it is bent sufficiently to form the desired square corner.

The present invention is believed to substantially advance the art by providing a cutter with the improved performance of chisel chain, but inexpensively made in a cold forming operation similar to chipper chain, i.e., without grinding the corner. Very briefly, the saw chain of the present invention is provided by coining a thickened rib-like section into the cutter blank prior to forming the top plate. This thickened section is precisely formed so that subsequent bending locates the thickened section at the corner. The flow of materials is such that the thickened section makes a significantly sharper corner than previous methods. Coining may, however, be desirable as a final step.

The invention and its advantages will be more apparent by reference to the following detailed description and drawings wherein:

FIG. 1 is an illustration in perspective of a saw chain having cutter links in accordance with the present invention;

FIGS. 2 through 5 are schematic illustrations of the steps used in the forming process for forming a cutter for a saw chain such as illustrated in FIG. 1; and FIG. 6 is a cross section of the saw chain as taken on section lines 6—6 of FIG. 1.

Referring to FIG. 1 of the drawing, a saw chain produced in accordance with the present invention includes center drive links 10 interconnected by tie straps 12. Certain of these tie straps are provided with cutter portions 14 and depth gauge portions 16. The cutter portions 14 include a side plate 18, top plate 20 and intermediate corner section 21.

The cutter portions are commonly formed by the operation referred to as cold forming. A cold forming operation has limits in that metal material such as used in making saw chain does not permit sharp bends. It is recognized that a cutter with a sharp corner, i.e., where the top plate and side plate meet at a substantially 90° intersection is desirable. Nevertheless, it is more common for the corners between the top plate and side plate to be substantially rounded, e.g., with an outside radius of curvature equal to the stock thickness or greater. The limited production of saw chain having substantially square corners (with a radius of curvature significantly less than the stock thickness) is accomplished with the cutters first being cold formed with rounded corners and then ground or machined to produce the square corners.

In the process of the present invention, a metal blank (the tie strap with cutter portion extending in the same plane, a condition existing prior to bending) is placed in a die and the cutter portion partially bent into an angle of about 30° from the main body portion of the tie strap (see FIG. 2). This partial bending is done for two reasons. It enables the cutter to be firmly held while the subsequent forming operations are accomplished and it also positions the cutter portion for the forming anvil.

The second step of the operation is illustrated in FIGS. 2 and 3. As shown in FIG. 2 in phantom lines, a forming punch 22 is positioned firmly over the cutter portion 14. The tie strap 12 with cutter portion 14 is held between die members 24 and 26. Referring to FIG. 3 it will be seen that driving the forming punch 22 against the cutter portion as shown restricts the end portion of the cutter and produces a coining effect in a manner which forces material into a rib-like thickened section 30 as shown, which preferably establishes a maximum thickness about 60 percent greater than the original thickness.

The next step is illustrated in FIG. 4. While holding the cutter in anvil sections 32 and 34, a second forming punch 28 bends the end portion of the cutter into position, thereby establishing the top plate 20 as shown.

The final step is illustrated in FIG. 5. While fully retaining the cutter, the flattening die 36 flattens the side plate. This flattening is done with a minimum required flow of metal as will be evident from comparing FIGS. 4 and 5.

The ability to cold form a cutter with a substantially square corner in accordance with the present invention is believed accomplished by reason of the following:

Metal can be deformed by stretching and shifting within limits, but it is difficult to compress. Thus in bending a plate, the center point is outside the plate thickness and it follows that the radius of bend on the outside surface of the plate is at least as great as the plate thickness. Attempting to make a sharper bend can cause buckling of the metal on the inside corner, seriously weakening the plate at that point. In order to form a corner with a radius smaller than the plate thickness, a second form of metal deformation is applied. Shifting metal by processes known as coining and/or upsetting is common and is used in forming sharper corners on saw chain cutters. See for example the commonly assigned U.S. Pat No. 3,144,891. However, in all known processes of saw chain production, such shifting of metal is accomplished only after the bending operation. Because of process limitations and limitations in the extent to which metal can be deformed in a cold forming operation, the industry has been unable to satisfactorily form a chisel type cutter without resorting to the further operation of grinding or milling. Prior to such grinding the sharpest corner achieved without serious weakening of the corner section of the plate was in excess of 75 percent of the side plate thickness.

It is believed that the present invention teaches for the first time how to combine the two forms of metal deformation, i.e., coining and bending, to produce a chisel type cutter. Very simply stated, the invention teaches that a rib of material should be coined into the plate prior to bending, and located so that in a subsequent bending operation the rib of material is positioned at the outside corner of the bend. The resultant corner can be substantially sharper than in prior methods. Yet a final coining or flattening of the side and top plates may be desirable. Simple as the process appears, it is pointed out that the inability to cold form a sharp corner on a saw chain cutter has plagued the industry for many years and the present process provides a significant contribution in overcoming that inability.

The invention is not to be limited to the specific example given or to the theories offered as an explanation of the benefits achieved, but rather is entitled to the full scope of the claims appended hereto.

What is claimed is:

1. A process for forming a saw chain cutter link that comprises forming a rib of material on a metal blank, and bending the blank to locate the rib of material at the outside corner of the bend.

2. A process for forming a saw chain cutter link as defined in claim 1 wherein said rib of material is formed by coining the metal blank, and including a further step of flattening the metal on each side of the rib of material after the bend to further sharpen the outside corner and essentially eliminate the radius of bend.

* * * * *